US012737402B2

(12) United States Patent
Wang et al.

(10) Patent No.: US 12,737,402 B2
(45) **Date of Patent: *Sep. 15, 2026**

(54) MACHINE LEARNED MODELS FOR SEARCH AND RECOMMENDATIONS

(71) Applicant: Maplebear Inc., San Francisco, CA (US)

(72) Inventors: Haixun Wang, Bellevue, WA (US); Taesik Na, Issaquah, WA (US); Li Tan, Fremont, CA (US); Jian Li, Santa Clara, CA (US); Xiao Xiao, San Diego, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/089,482

(22) Filed: Mar. 25, 2025

(65) Prior Publication Data

US 2025/0225165 A1 Jul. 10, 2025

Related U.S. Application Data

(63) Continuation of application No. 18/415,551, filed on Jan. 17, 2024, now Pat. No. 12,287,819.

(60) Provisional application No. 63/439,715, filed on Jan. 18, 2023.

(51) Int. Cl.

*G06F 16/334* (2025.01)
*G06F 16/338* (2019.01)
*G06N 20/00* (2019.01)

(52) U.S. Cl.

CPC ........ *G06F 16/3344* (2019.01); *G06F 16/338* (2019.01); *G06N 20/00* (2019.01)

(58) Field of Classification Search

CPC .... G06F 16/3344; G06F 16/338; G06N 20/00
See application file for complete search history.

(56) References Cited

U.S. PATENT DOCUMENTS

| | | | |
|---|---|---|---|
| 10,706,450 | B1 | 7/2020 | Tavernier |
| 10,810,543 | B2 | 10/2020 | Hsieh et al. |
| 10,866,976 | B1 | 12/2020 | Yoon et al. |
| 11,488,223 | B1 | 11/2022 | Suprasadachandran et al. |

(Continued)

OTHER PUBLICATIONS

Non-Final Rejection Mailed on Oct. 11, 2024 for U.S. Appl. No. 18/415,551, 13 page(s).

(Continued)

*Primary Examiner* — Jorge A Casanova
(74) *Attorney, Agent, or Firm* — Fenwick & West LLP

(57) ABSTRACT

A system may generate a prompt based in part on a search query from a customer client device. The prompt instructs a machine learned model to provide item predictions. And the model was trained by: converting structured data describing items of an online catalog to annotated text data (unstructured data), generating training examples based in part on the annotated text data, and training the model using the training examples. The system may receive item predictions generated by the prompt being applied to the machine learned model, the item predictions may have corresponding item identifiers. The item predictions are processed to identify a recommended item from the item predictions. The processing includes determining item information for the recommended item using an item identifier associated with the recommended item. The item information is provided to the customer client device.

20 Claims, 11 Drawing Sheets

(56) References Cited

U.S. PATENT DOCUMENTS

| | | | |
|---|---|---|---|
| 11,854,063 | B2 | 12/2023 | Zhuang et al. |
| 2017/0344615 | A1 | 11/2017 | Islam et al. |
| 2019/0236681 | A1 | 8/2019 | Konik et al. |
| 2022/0230223 | A1 | 7/2022 | Jones et al. |
| 2022/0245706 | A1 | 8/2022 | Chaidaroon et al. |
| 2022/0335489 | A1 | 10/2022 | Rao Karikurve et al. |
| 2023/0113122 | A1 | 4/2023 | Rao et al. |
| 2023/0161825 | A1 | 5/2023 | Li et al. |

OTHER PUBLICATIONS

PCT International Search Report and Written Opinion, PCT Application No. PCT/US2024/012068, Apr. 19, 2024, 8 pages.

600

MACHINE LEARNED MODELS FOR SEARCH AND RECOMMENDATIONS

CROSS REFERENCE TO RELATED APPLICATION

This application is a continuation of co-pending U.S. patent application Ser. No. 18/415,551, filed Jan. 17, 2024, which claims the benefit of U.S. Provisional Application No. 63/439,715, filed Jan. 18, 2023, each of which is incorporated by reference in its entirety.

BACKGROUND

In online systems, search and recommendation conventionally operate on structured data, such as product inventory, catalogs, and taxonomies. However, search and recommendation systems can be improved using unstructured data (e.g., information on the web, customer reviews, etc.). Traditionally, the approach has been to convert unstructured data into structured data through information extraction, such that the structured data can be used in conventional search and recommendation systems that utilize structured data. But the computational costs of doing this (e.g., processing resources) can be extremely high.

Online searching is a knowledge-intensive task. Providing customers with recommendations, ideas, and inspiration generally is based on knowledge that is outside of the product database. Companies invest heavily in developing product knowledge graphs with a goal of learning everything there is to know about their products, but such product knowledge graphs have had limited success to date. At least two obstacles exist. First, modeling such knowledge explicitly in a product knowledge graph generally uses a very complex schema or ontology, which makes accessing such knowledge challenging because algorithms may have to navigate the complex schema or ontology. Second, it is difficult to develop a general-purpose algorithm that can convert unstructured data about any product into a structured format, because each product type may require the development of algorithms that identify patterns that are specific to that product type.

SUMMARY

In accordance with one or more aspects of the disclosure, an environment for using machine learned models for search and recommendation in e-commerce are described. An online concierge system converts structured data (e.g., item data in an online catalog) to annotated text data (unstructured data). The online concierge system may generate templates (e.g., using a machine learned model) for use with the structured data. The machine learned model may be part of an artificial intelligence (AI) system. In some embodiments, the machine learned model may be part of the online concierge system. The online concierge system may generate annotated text data for the structured data (e.g., items in the online catalog) using the generated templates and structured data (e.g., the online catalog). In some embodiments, the online concierge system may populate the templates using information from the structured data. The online concierge system may use the templates and the structured data to generate prompts for the machine learned model to generate corresponding annotated text data. The online concierge system may provide the prompts to the AI system (or in some embodiments directly to the machine learned model) and receive annotated text data generated using the one or more prompts. The online concierge system may train a search and recommendation model using the annotated text data.

Responsive to receiving a search query from a customer client device, the online concierge system may generate a prompt that is based in part on the search query. The online concierge system may provide the generated prompt to the search and recommendation model which generates one or more item predictions (that may include item identifiers). The online concierge system may process the one or more item predictions to identify a recommended item from the one or more item predictions that is part of the online catalog. The online concierge system may use an item identifier for the recommended item to determine associated item information (e.g., price, name, etc.). The online system may provide to the customer client device the item information.

In some aspects, the techniques described herein relate to a method, performed at a computer system including a processor and a non-transitory computer readable medium, including: receiving a search query from a customer client device; generating a prompt based in part on the search query to provide to a machine learned model, the prompt instructing the machine learned model to provide one or more item predictions; wherein the machine learned model was trained by: converting structured data describing items of an online catalog to annotated text data, wherein annotated text data is unstructured textual descriptions of the items that include item identifiers, generating training examples based in part on the annotated text data, wherein some of the training examples include the descriptions of the items, and training the machine learned model using the training examples to predict one or more items of the online catalog that are related to the descriptions, such that for a given prompt that is based in part on a query the machine learned model outputs item predictions related to the query that include item identifiers; receiving one or more item predictions generated by the prompt being applied to the machine learned model, the one or more item predictions having corresponding item identifiers; processing the one or more item predictions to identify a recommended item from the one or more item predictions, wherein the processing includes determining item information for the recommended item using an item identifier associated with the recommended item; and providing, to the customer client device, the item information describing the recommended item.

In some aspects, the techniques described herein relate to a computer program product including a non-transitory computer readable storage medium having instructions encoded thereon that, when executed by a processor of a computer system, cause the computer system to: receive a search query from a customer client device; generate a prompt based in part on the search query to provide to a machine learned model, the prompt instructing the machine learned model to provide one or more item predictions; wherein the machine learned model was trained by: converting structured data describing items of an online catalog to annotated text data, wherein annotated text data is unstructured textual descriptions of the items that include item identifiers, generating training examples based in part on the annotated text data, wherein some of the training examples include the descriptions of the items, and training the machine learned model using the training examples to predict one or more items of the online catalog that are related to the descriptions, such that for a given prompt that is based in part on a query the machine learned model outputs item predictions related to the query that include item identifiers; receive one or more item predictions generated by the prompt being applied to the machine learned model, the one or more item predictions having corresponding item identifiers; process the one or more item predictions to identify a recommended item from the one or more item predictions, and to determine item information for the recommended item using an item identifier associated with the recommended item; and provide, to the customer client device, the item information describing the recommended item.

In some aspects, the techniques described herein relate to a computer system including: a processor; and a non-transitory computer readable storage medium having instructions encoded thereon that, when executed by the processor, cause the processor to: receive a search query from a customer client device, generate a prompt based in part on the search query to provide to a machine learned model, the prompt instructing the machine learned model to provide one or more item predictions, wherein the machine learned model was trained by: converting structured data describing items of an online catalog to annotated text data, wherein annotated text data is unstructured textual descriptions of the items that include item identifiers, generating training examples based in part on the annotated text data, wherein some of the training examples include the descriptions of the items, and training the machine learned model using the training examples to predict one or more items of the online catalog that are related to the descriptions, such that for a given prompt that is based in part on a query the machine learned model outputs item predictions related to the query that include item identifiers, receive one or more item predictions generated by the prompt being applied to the machine learned model, the one or more item predictions having corresponding item identifiers, process the one or more item predictions to identify a recommended item from the one or more item predictions, and to determine item information for the recommended item using an item identifier associated with the recommended item, and provide, to the customer client device, the item information describing the recommended item.

DETAILED DESCRIPTION

Figure 1:
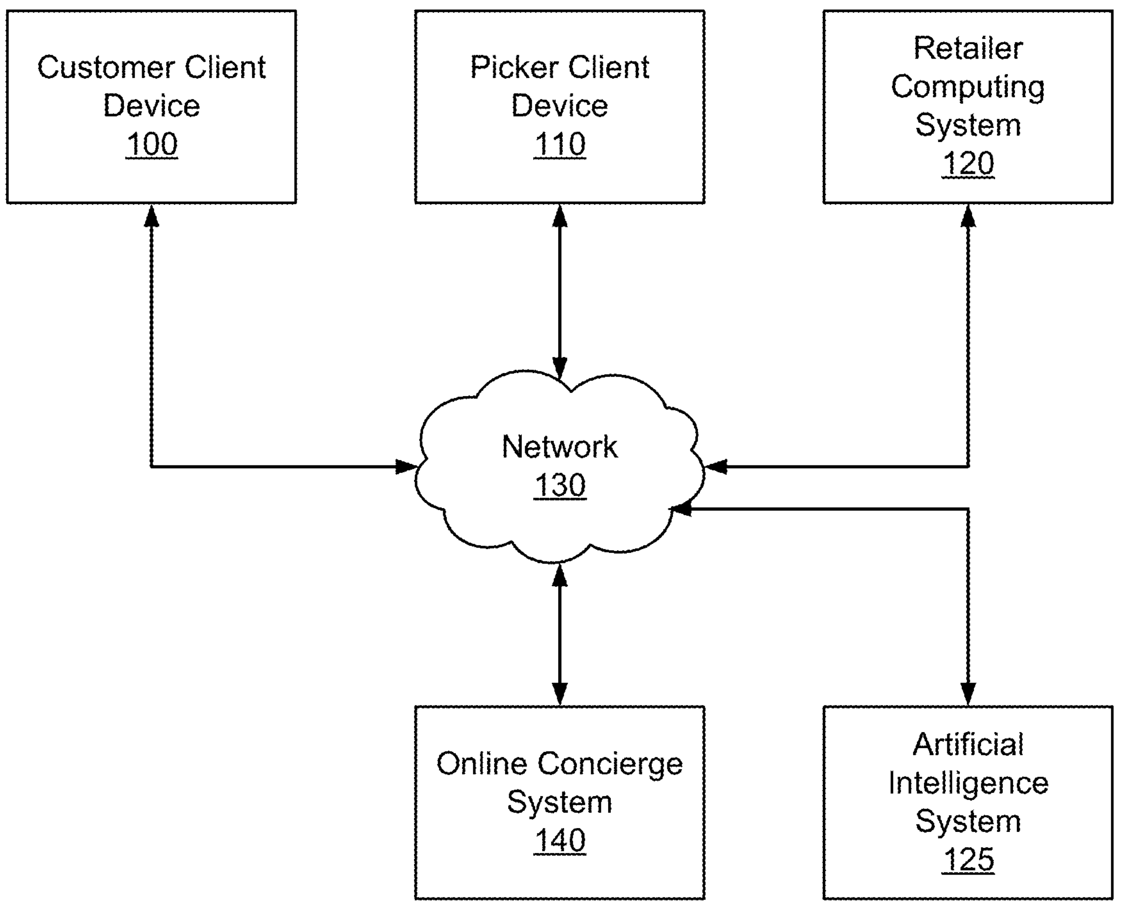
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, an artificial intelligence (AI) system 125, a network 130, and an online concierge system 140. Alternative embodiments may include more, fewer, or different components from those illustrated in FIG. 1, and the functionality of each component may be divided between the components differently from the description below. For example, some or all of the functionality of the AI system 125 may be performed by the online concierge system 140. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items of an online catalog to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140. Responsive to receiving a search query via the ordering interface, and the customer client device 100 provides the query to the online concierge system 140. A search query is text for a word or set of words that indicate items of interest to the customer. The customer client device 100 receives a response to the query from the online concierge system 140. The response may include, e.g., item information (e.g., name, price, brand, etc.) for one or more recommended items, item information for one or more recommended item replacements, item information for one or more personalized item recommendations, or some combination thereof. The customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The AI system 125 is configured to apply prompts to machine learned models to generate information for the online concierge system 140. The generated information may be used to convert structured data to unstructured data (i.e., annotated text data). The generated information may include, e.g., templates, annotated text, or some combination thereof. The AI system 125 includes a machine learned model. In some embodiments, the machine learned model may be a generative machine learned model. In some embodiments, AI system 125 may be a third-party server that is independent and separate from the online concierge system 140.

In some embodiments, the AI system 125 may receive prompts for the machine learned model to generate templates for items in the online catalog, templates for categories of items in the online catalog, or some combination thereof. The prompts may be received from the online concierge system 140. The AI system 125 may apply the prompts to the machine learned model to generate one or more templates, and provide the generated one or more templates to the online concierge system 140.

In some embodiments, the AI system 125 may receive prompts for the machine learned model to generate annotated text data based on structured data (e.g., item data in the online catalog) and one or more templates. In some embodiments, the structured data is separate from the one or more templates, and the AI system 125 populates the templates using information for the structured data in executing a particular prompt. In some embodiments, the templates are populated with information (e.g., item data) for the structured data. The prompts may be received from the online concierge system 140. The AI system 125 may apply the prompts to the machine learned model to generate annotated text data, and provide the generated annotated text data to the online concierge system 140. Annotated text data are unstructured textual descriptions of the items that include item identifiers for the items. In this manner, a machine learned model is used to convert structured data describing items to unstructured data (i.e., annotated text data) in preparation of training (e.g., fine tuning) a large language model (e.g., the search and recommendation model).

Note that while the AI system 125 is described in the context of a single machine learned model. In some embodiments, it may include more than one machine learned model.

The online concierge system 140 converts structured data to annotated text data. The structured data may be, e.g., an online catalog of items for sale via the online concierge system 140, information from a relational database, a query database, some other data in a standardized format that describes the items in the online catalog, or some combination thereof. The online concierge system 140 may generate templates based on the various attributes in the structured data and/or semi-structured data that is meant to be incorporated into the corpus of the LLM. For example, in a case of an online catalog, the generated templates may be based on attributes (e.g., item identifier, name, manufacturer, price, etc.) for a particular item of the online catalog. The online concierge system 140 may generate multiple natural language templates for each attribute that relate a given attribute to the item identifier in different ways. In some embodiments, the online concierge system 140 generates prompts for the machine learned model of the AI system 125 to generate templates.

The online concierge system 140 may generate annotated text data for the structured data (e.g., items in the online catalog) using the generated templates and structured data (e.g., the online catalog). In some embodiments, the online concierge system 140 may populate the templates using information from the structured data. The online concierge system 140 may use the one or more templates and the structured data to generate prompts for the machine learned model of the AI system 125 to generate corresponding annotated text data. The online concierge system 140 may provide the prompts to the AI system 125 (for providing to the machine learned model) and receive annotated text data generated using the one or more prompts from the AI system 125. In this manner, structured data (e.g., describing items of the online catalog) are converted to unstructured data (i.e., annotated text data) in preparation of training a search and recommendation model.

The online concierge system 140 may train a search and recommendation model using the annotated text data. Training as described herein may include fine tuning the search and recommendation model with a language modeling (LM) objective using the annotated text data. In some embodiments, the training of the search and recommendation model is based in part on self-supervised learning. Training of the search and recommendation model is described below with regard to FIGS. 2, 3, 5, and 6. Once training is complete, the search and recommendation model may be proficient in using domain-specific e-commerce world knowledge in conjunction with information obtained from what was originally the structured data. In some embodiments, the online concierge system 140 includes the search and recommendation model.

In one or more embodiments, at least some of the one or more machine learned models (e.g., the machine learned model of the AI system 125, the search and recommendation model, etc.) described herein are large language models (LLMs) that are trained on a large corpus of training data to generate outputs for the natural language processing (NLP) tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. In some embodiments, the LLM of the AI system 125 may be pre-trained by the AI system 125, and the LLM of the online concierge system 140 may be pre-trained by the online concierge system 140. In other embodiments, the online concierge system 140 may train both LLMs. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In some embodiments, one or more of the machine-learned models are LLMs and have an encoder based architecture. In these embodiments, the LLMs may be trained using, e.g., masked language models, document retrieval, related document retrieval, product encoding, or some combination thereof.

In some embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

Note that in other embodiments, one or more of the machine-learned models that are LLMs can be configured as any other appropriate architecture including, but not limited to, long short-term memory (LSTM) networks, Markov networks, BART, generative-adversarial networks (GAN), diffusion models (e.g., Diffusion-LM), and the like.

The customer client device 100, the picker client device 110, the retailer computing system 120, the AI system 125, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 responds to search queries from the customer client device 100 with item information associated with one or more recommended items. Responsive to receiving a search query from the customer client device 100, the online concierge system 140 may generate a prompt that is based in part on the search query. The online concierge system 140 may provide the generated prompt to the search and recommendation model which generates one or more item predictions (that include item identifiers) associated with the prompt. The online concierge system 140 may process the one or more item predictions to identify a recommended item from the one or more item predictions that is part of the online catalog. The online concierge system 140 may use an item identifier for the recommended item to determine associated item information. Item information is information associated with the recommended item. Item information may include, e.g., item data (name, price, brand, size, icon, etc.) for the recommended item in the online catalog, and some embodiments may also include, customer data associated with the recommended item, some other information associated with the recommended item, or some combination thereof. The online concierge system 140 may provide to the customer client device 100 item information (price, name, etc.) describing the recommended item.

In this manner, the online concierge system 140 utilizes the search and recommendation model, an LLM, to determine a response to a search query from the customer client device 100. Using the LLM in this manner has several advantages over conventional search and recommendation systems that are based on structured data (e.g., product knowledge graphs). For example, answering search queries like "healthy snacks for kids" or "alternatives to ice creams" generally requires world knowledge, which is difficult to capture in product knowledge graphs but is readily available in pre-trained LLMs (e.g., GPT-3). Another advantage is that LLMs provide a text-to-text interface, eliminating a need for a separate query understanding system. Another advantage is that while converting structured data to text is not trivial, the relevant structured data for any specific task such as e-commerce search is not only limited in size and variety, but also well understood due to the presence of a schema.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
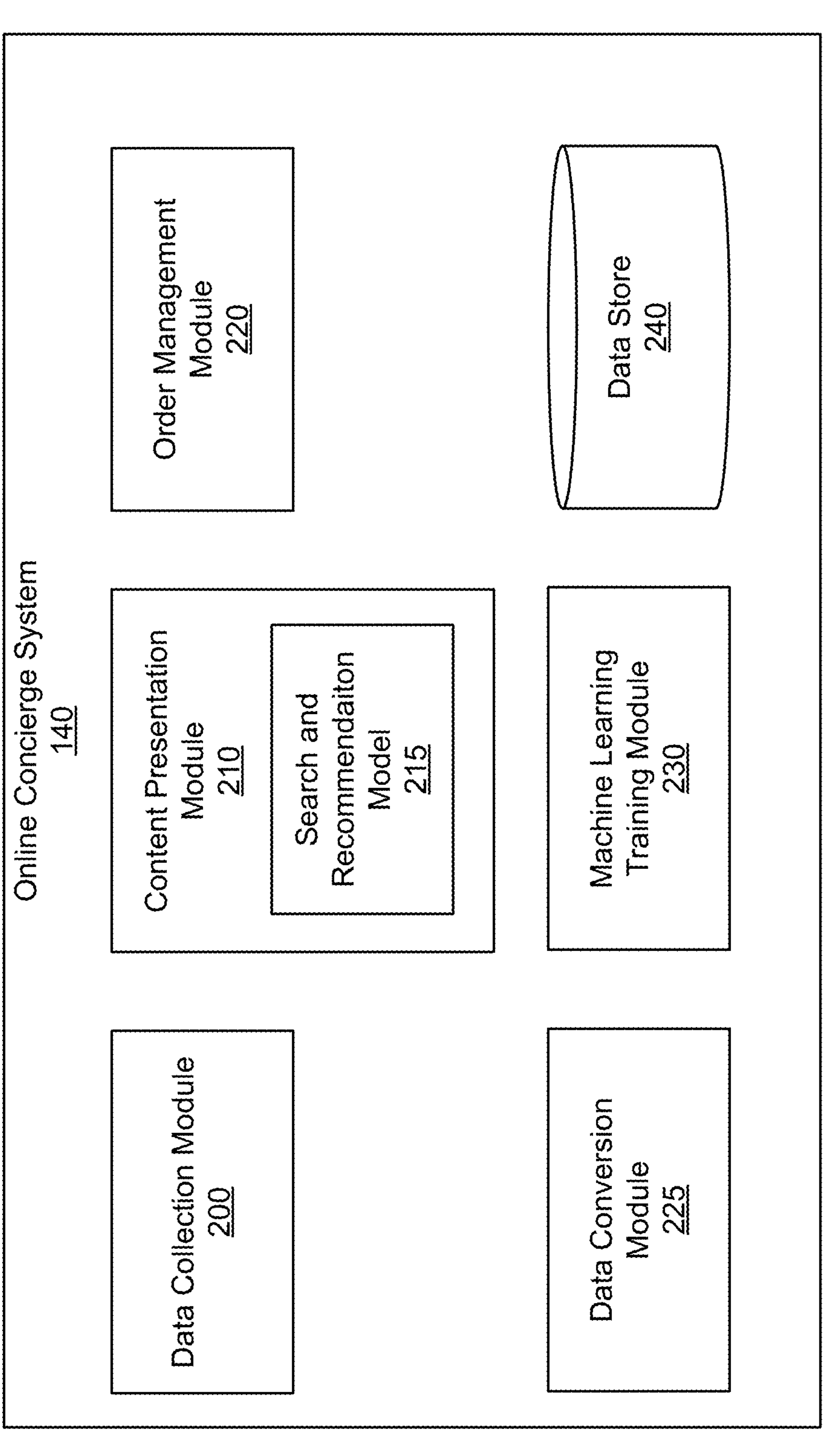
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a data conversion module 225, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, stored payment instruments, engagement history (e.g., query history, item selection, item purchase history, etc.), some other data pertaining to customer interactions with the online concierge system 140, or some combination thereof. The data collection module 200 may store customer data as structured data (e.g., a relational database, query database, etc.) and/or semi-structured data in the data store 240. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. The item identifier for an item, uniquely identifies the item within the online catalog. The item identifier may be, e.g., a token, a stock keeping unit (SKU), a serial number for the item, some other information that uniquely identifies the item within the online catalog, or some combination thereof. Additionally, item data may also include attributes of items such as the size, color, weight, item identifier, etc. The item data may further include brand of the item, manufacturer of the item, icon for the item, item category of the item, feature (e.g., organic, kosher, etc.), availability, price, etc. The item data may further include price, and may include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100. For example, the data collection module 200 may use updated pricing information for items to keep prices up-to-date/current for items in the online catalog. The data collection module 200 maintains an online catalog that stores the item data as structured data (e.g., a relational database, query database, etc.) and/or semi-structured data. An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents the online catalog to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 responds to search queries from the customer client device 100 with item information for one or more recommended items. Responsive to receiving a search query from the customer client device 100, the content presentation module 210 may generate one or more prompts that are based in part on the search query. Prompts may be directed to, e.g., search retrieval, item replacement, personalized search suggestions, etc. For example, given a query for "milk" for a particular Retailer, the content presentation module 210 may generate a search retrieval type prompt, a product replacement prompt, a personalized search suggestion prompt, some other prompt, or some combination thereof. In this example, a search type prompt may be "Show relevant products for 'milk,' provide alternatives for 'milk' and commonly purchased items at Retailer. List with item identifiers and organize answers." The product replacement type of prompt may be "Show replacements for [P001]. List with item identifiers." In this example, [P100] is a specific item identifier for a particular milk item. And the personalized search suggestion type of prompt may be, e.g., "Products to buy next: yeast baking pickling salt, pasta noodles."

In some embodiments, the content presentation module 210 may personalize the prompt for the customer. For example, the content presentation module 210 may generate the prompt in part on customer data (e.g., engagement history) of the customer stored in the data store 240. Personalized prompt generation is also described below with regard to FIG. 8.

The content presentation module 210 provides the generated one or more prompts to a search and recommendation model 215. The search and recommendation model 215 is an LLM that is trained to predict one or more items of the online catalog as being relevant to the search query, output one or more corresponding item predictions. An item prediction may be, e.g., an item identifier for an item of the online catalog. In some embodiments, an item prediction may also include an associated relevance score for the item. A relevance score for an item prediction estimates how relevant the item prediction is to the prompt. In alternate embodiments, the search and recommendation model 215 is part of a third party system that is not part of the online concierge system 140.

In these instances, the search and recommendation model 215 may, e.g., provide the generated prompts to the third party system. The third party system applies the prompts to the model to generate the one or more item predictions, and provides the generated one or more item predictions to the online concierge system 140.

The content presentation module 210 may process the one or more item predictions to identify a recommended item from the one or more item predictions that is part of the online catalog. Processing may refer to one or more ways (e.g., parse/entity linking, scoring, ranking, selecting, etc.) in which one or more recommended items are selected from the one or more item predictions. Parse/entity linking may be used to obtain, e.g., up-to-date pricing information, availability information, etc., by connecting to a current version of the online catalog or some other database that includes the current information. Ranking may be performed using multi-objective ranking.

For example, the content presentation module 210 may score the one or more item predictions based on the search query received from the customer client device 100. In some embodiments, the content presentation module 210 uses relevance scores of the one or more item predictions to rank the one or more item predictions, and selects one or more of the ranked one or more item predictions as recommended items. For example, the content presentation module 210 may select the highest ranked as the recommended item.

In another example, the content presentation module 210 may score the one or more item predictions based on a relatedness of the items described by the one or more item predictions to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In another example, the content presentation module 210 may use an item selection model to score the one or more item predictions for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score the one or more item predictions. These item embeddings and customer embeddings may be generated by separate machine learning models and may be stored in the data store 240.

In another example, the content presentation module 210 scores the one or more item predictions based on a predicted availability of an item prediction. The content presentation module 210 may use an availability model to predict the availability of an item prediction. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

Note that the content presentation module 210 may use multiple scoring techniques (e.g., like the ones above) and combine some or all of them to generate an aggregate score for an item prediction. For example, the content presentation module 210 may score the one or more item predictions using two different scoring techniques, and then combine them using a weighted sum to determine aggregate scores for each of the one or more item predictions. The content presentation module 210 may rank the one or more item predictions by aggregate score, and select one or more of the ranked one or more item predictions as recommended items.

The content presentation module 210 retrieves (e.g., from the data store 240) item information (name, price, icon, etc.) for any of the recommended items. The content presentation module 210 provides the item information for the recommended items to the client device 100.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The data conversion module 225 converts structured data (e.g., describing items of the online catalog) to annotated text data. Annotated text data may be, e.g., unstructured textual descriptions of the items that include item identifiers for those items. Note that the online catalog stores item data as structured data and/or semi-structured data. For example, the online catalog may store item data in a relationship database. In some embodiments, for a given item, the online catalog may have item data describing different attributes: item identifier, name, item category, brand, price, icon, feature, availability, manufacturer, etc. In this manner, the structured data includes relational table information that relates the various attributes for the item to each other.

The data conversion module 225 may generate templates based on the various attributes in the structured data that is meant to be incorporated into the corpus of the LLM. For example, in the online catalog, the generated templates may be based on attributes for a particular item of the online catalog. The data conversion module 225 may generate multiple natural language templates for each attribute that relate a given attribute to the item identifier in different ways. For example, the data conversion module 225 may generate templates like the following for use with the attributes of the online catalog. For example, for a 'name' attribute, the data conversion module 225 may generate, e.g., "[item identifier] is [name]," "[item identifier] [name] of brand is manufactured by [manufacturer]," etc., where [ ] detonates attribute information taken from the online catalog and/or some other structured data and/or semi-structured data source. The data conversion module 225 may generate similar templates for some or all of the attributes. Note in some embodiments, the generated templates may have a Boolean aspect. For example, a template may be: "[item identifier] [name] is ([organic]==true? organic: not organic)," "([organic]==true? [item identifier] is considered healthy as it is organic)," etc.

In some embodiments, the data conversion module 225 uses the AI system 125 to generate templates. The data conversion module 225 may generate one or more prompts for the machine learned model (e.g., a generative machine learned model) of the AI system 125 to generate templates for items in the online catalog, templates for categories of items in the online catalog, or some combination thereof. The data conversion module 225 may provide the one or more prompts to the AI system 125 (for providing to the machine learned model) and receive templates generated using the one or more prompts from the AI system 125.

The data conversion module 225 generates annotated text data for structured data (e.g., items in the online catalog) using the generated templates and structured data (e.g., the online catalog). The data conversion module 225 may generate templates for some or all of the items in the online catalog. In some embodiments, the data conversion module 225 may populate the templates using information from the structured data. The data conversion module 225 may use the generated templates and structured data to generate one or more prompts for the machine learned model of the AI system 125. The one or more prompts may instruct the machine learned model to generate corresponding annotated text data. The data conversion module 225 may provide the one or more prompts to the AI system 125 (for providing to the machine learned model) and receive annotated text data generated using the one or more prompts from the AI system 125.

In some embodiments, the data conversion module 225 may, for a subset of items of the online catalog, generate a corresponding subset of annotated text data. The data conversion module 225 may then convert the corresponding subset of annotated text data into example shells which can be used for other items of the online catalog. For example, the data conversion module 225 may remove item data from some of the annotated text data to generate the shells. The data conversion module 225 can make the shell generic to many types of items, especially items within the same product category. The data conversion module 225 can populate the shells with item data from the other items that are not part of the subset of items to generate annotated text data. In this manner, the machine learned model can be used to generate a relatively small number of annotated text data, which could then be turned into shells and applied to the relatively large number of items of the online catalog to generate corresponding annotated text data for those items. Additional details regarding generation of annotated text are described below with regard to FIG. 4.

The machine learning training module 230 trains machine learning models used by the online concierge system 140. For example, the machine learning training module 230 may train the search and recommendation model, the item selection model, etc. In some embodiments, the machine learning training module 230 also trains models used by the AI system 125. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In the case of training the search and recommendation model 215, the machine learning training module 230 generates training examples using the annotated text data. The generated training examples include descriptions (natural language descriptions) of the structured data (e.g., item data from the online catalog) derived from the annotated text data. Training examples may be generated for different applications like, e.g., search retrieval, item replacement, personalized search suggestions, etc. In some embodiments, the generated training examples may also inject general world knowledge. This may be useful for the e-commerce domain as additional examples to encourage the search and recommendation model 215 to retain world knowledge specific to the e-commerce domain and linguistic syntax and semantics of the language in the LLM. During training, the search and recommendation model 215 learns item identifiers as novel vocabularies while also establishing correlations between these new concepts and the pre-existing world knowledge embedded in the search and recommendation model 215.

Note, in this manner, the search and recommendation model 215 is trained to become proficient in using domain-specific e-commerce world knowledge in conjunction with information derived from structured data (e.g., the online catalog). As such, the search and recommendation model 215 may be used to generate item predictions that include item identifiers. Training of the search and recommendation model 215 and/or embodiments thereof is also described below with regard to, e.g., FIGS. 3-6.

In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, templates, online catalog, order data, and picker data for use by the online concierge system 140. The data store 240 also stores trained machine learning models (e.g., the search and recommendation model 215) trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
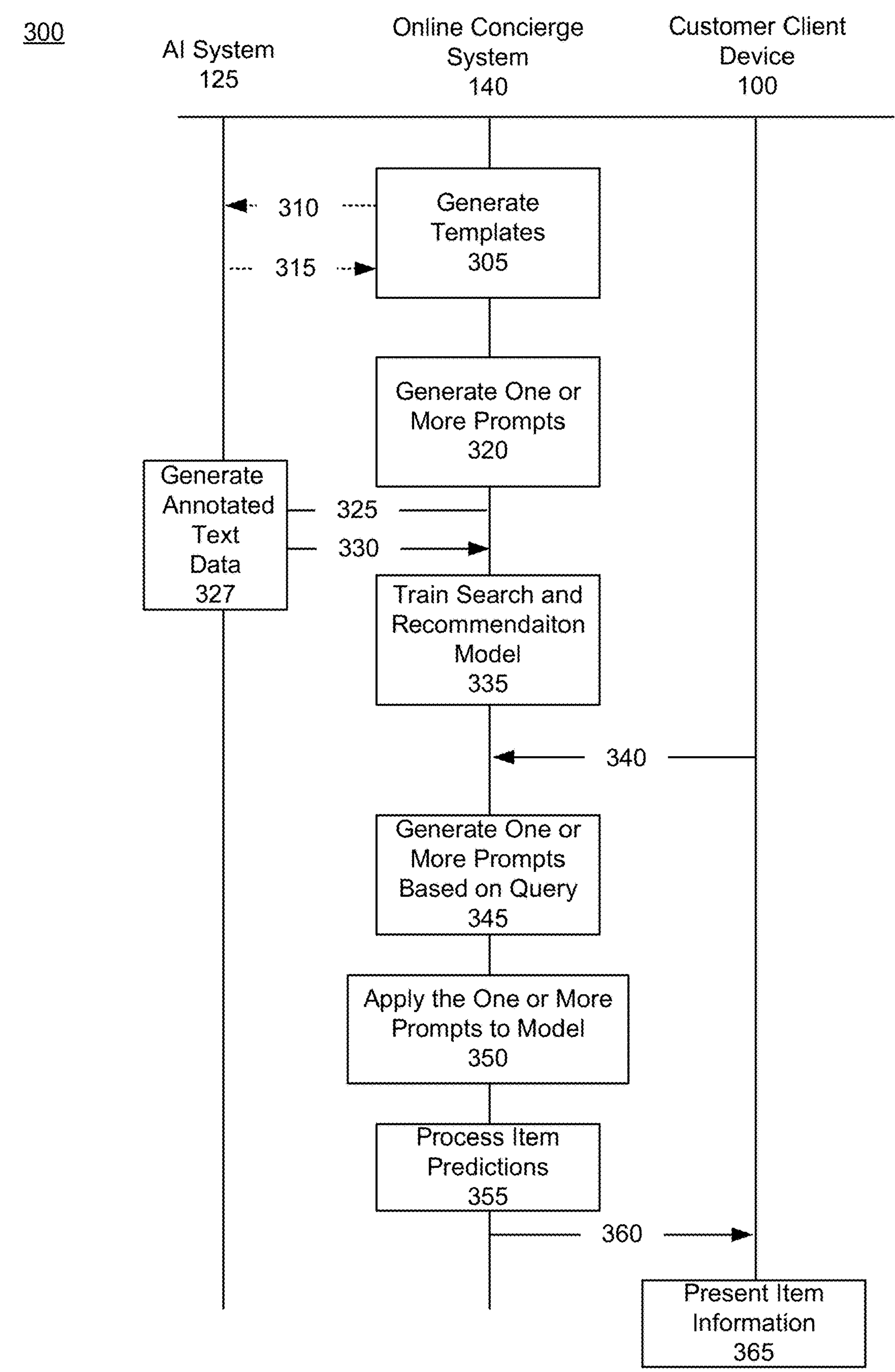
FIG. 3 is an example sequence diagram describing the interaction of various components of a system environment that utilizes machine learned models for search and recommendation in e-commerce, in accordance with some embodiments.

FIG. 3 is an example sequence diagram 300 describing the interaction of various components of a system environment that utilizes machine learned models for search and recommendation in e-commerce, in accordance with some embodiments. Alternative embodiments may include more, fewer, or different interactions from those illustrated in FIG. 3, and the steps may be performed in a different order from that illustrated in FIG. 3.

The online concierge system 140 generates 305 templates. The online concierge system 140 may generate templates based on various attributes in structured data that is meant to be incorporated into the corpus of a search and recommendation model (e.g., the search and recommendation model 215). For example, the online concierge system 140 may generate templates that are to be used with the structured data of the online catalog. For example, for a 'name' attribute, the online concierge system 140 may generate templates like, e.g., "[item identifier] is [name]," "[item identifier] [name] of brand is manufactured by [manufacturer]," etc., where [ ] detonates attribute information taken from the online catalog. The online concierge system 140 may generate multiple templates for a given attribute of structured data.

In some embodiments, the online concierge system 140 uses a machine learned model (e.g., of the AI system 125) to generate templates. The online concierge system 140 may generate one or more prompts for a machine learned model of the AI system 125 to generate templates for the structured data. For example, the templates may be for items in the online catalog, templates for categories of items in the online catalog, or some combination thereof. The online concierge system 140 provides 310 the one or more prompts to the AI system 125 (for providing to the machine learned model).

Responsive to receiving the one or more prompts, the AI system 125 applies the prompts to the machine learned model to generate one or more templates, and provides 315 the templates generated using the one or more prompts to the online concierge system 140. Note in some embodiments, the online concierge system 140 includes the AI system 125 and the machine learned model.

The online concierge system 140 uses the generated templates and structured data to generate 320 one or more prompts for the machine learned model of the AI system 125. The one or more prompts instruct the machine learned model to generate corresponding annotated text data. The online concierge system 140 provides 325 the one or more prompts to the AI system 125.

Responsive to receiving the one or more prompts, the AI system 125 applies the prompts to the machine learned model to generate 327 annotated text data, and provides 330 the generated annotated text data to the online concierge system 140.

The online concierge system 140 trains 335 the search and recommendation model 215 using the annotated text data. The online concierge system 140 generates training examples using the annotated text data. The generated training examples may include descriptions (natural language descriptions) of the structured data (e.g., item data from the online catalog) derived from the annotated text data. Training examples may be generated for different applications like, e.g., search retrieval, item replacement, personalized search suggestions, etc. In some embodiments, the generated training examples may also inject general world knowledge.

A customer client device 100 provides 340 a search query to the online concierge system 140. A customer may use the customer client device 100 to generate the search query. The search query may be, e.g., "milk."

The online concierge system 140 generates 345 (via the content presentation module 210) one or more prompts based on the search query. For example, given a query for "milk," the online concierge system 140 may generate a search retrieval type prompt, a product replacement prompt, a personalized search suggestion prompt, some other prompt, or some combination thereof. In this example, a search type prompt may be "Show relevant products for 'milk,' provide alternatives for 'milk' and commonly purchased items. List with item identifiers and organize answers." The product replacement type of prompt may be "Show replacements for [P001]. List with item identifiers." In this example, [P100] is a specific item identifier for a particular milk item. And the personalized search suggestion type of prompt may be, e.g., "Products to buy next: yeast baking pickling salt, pasta noodles."

The online concierge system 140 applies 350 the one or more prompts to the search and recommendation model 215. Responsive to the one or more prompts, the search and recommendation model 215 predicts one or more items of the online catalog as being relevant to the search query and outputs one or more corresponding item predictions. Each item prediction includes a corresponding item identifier, and in some cases may also include an associated relevance score.

The online concierge system 140 processes 355 the one or more item predictions to identify one or more recommended items from the one or more item predictions that is part of the online catalog. Processing may refer to one or more ways (e.g., scoring, ranking, selecting, parsing/entity linking, etc.) in which one or more recommended items are selected from the one or more item predictions. For example, the online concierge system 140 may use relevance scores of the one or more item predictions to rank the one or more item predictions, and selects one or more of the ranked one or more item predictions as recommended items (e.g., select the highest ranked as a recommended item). The processing may include determining item information (e.g., via parsing/entity linking) for the one or more recommended items using item identifiers associated with the one or more recommended items. For example, the online concierge system 140 system may use an item identifier of a recommended item to determine a current price for the recommended item in, e.g., the online catalog, and/or a structured database and/or semi structured database that includes current pricing information for the recommended item. The online concierge system 140 can then update item information for the recommended item with the current price.

The online concierge system 140 provides 360 to the customer client device 100 item information describing the one or more recommended items. The item information may include, e.g., current prices, name, band, availability, icon, etc.

The customer client device 100 presents 365 item information for the one or more recommended items to the customer. For example, the customer client device 100 may present some or all the item information for the one or more recommended items using the ordering interface.

Figure 4:
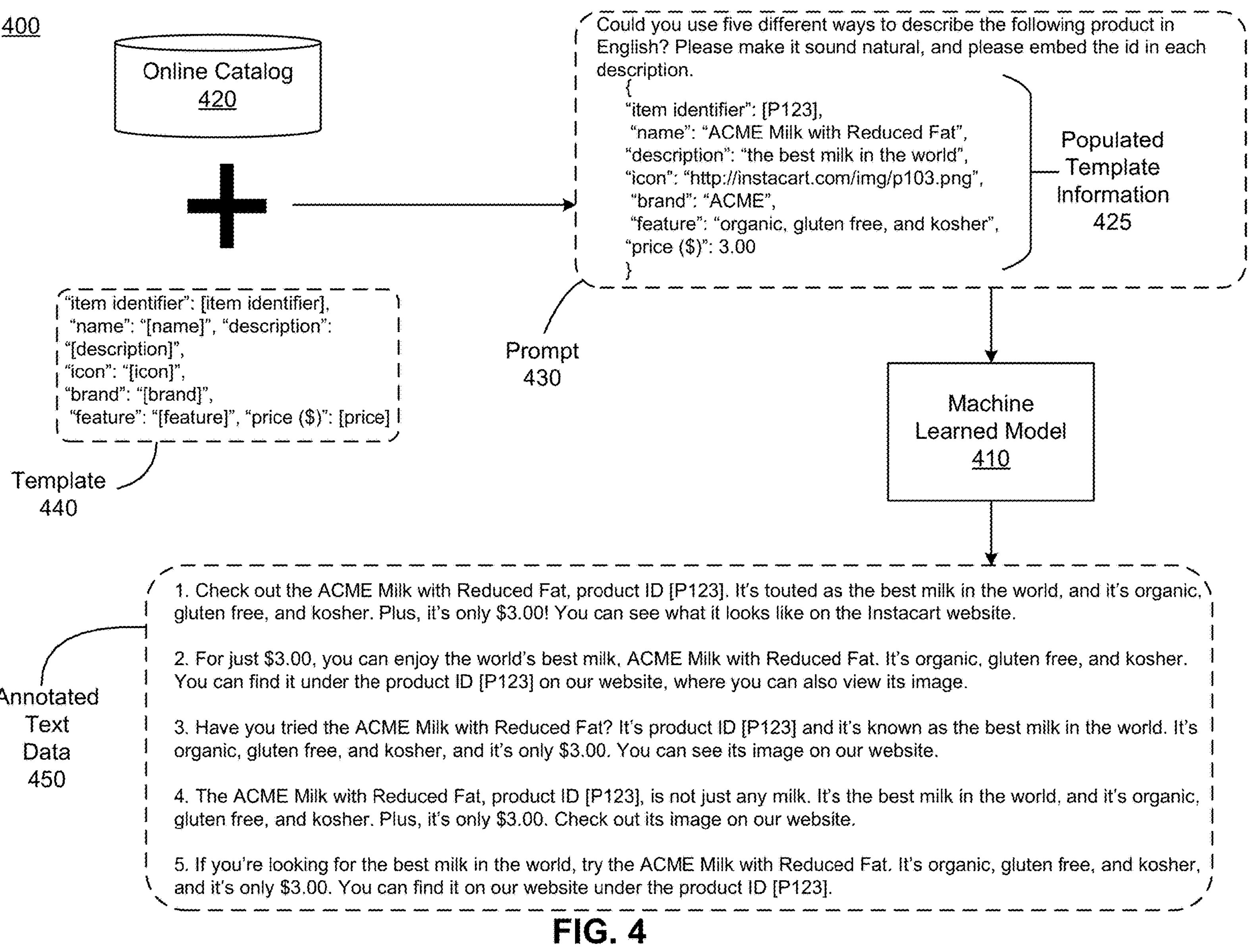
FIG. 4 is an example conversion of structured data to unstructured data using a machine learned model, in accordance with some embodiments.

FIG. 4 is an example conversion 400 of structured data to unstructured data using a machine learned model 410, in accordance with some embodiments. The machine learned model 410 is implemented in accordance with one or more embodiments of the machine learned model used by the AI system 125.

A prompt 430 is generated (e.g., by the data conversion module 225) using structured data from the online catalog 420 and a template 440. For a given item of the online catalog 420, the template 440 is populated with attributes from item data for that item. For example, the template 440 includes: '"item identifier": [item identifier]' for the item identifier attribute, and the corresponding portion of the populated template information 425 is '"item identifier": [P123],' where [P123] is the item identifier attribute taken from the online catalog 420. In this manner, the template 440 is populated with structured data from the online catalog 420 for the given item to generate the populated template information 425 of the prompt 430.

The prompt 430 is applied to the machine learned model 410 to generate annotated text data 450. For example, the online concierge system 140 may provide the prompt 430 to the AI system 125, and the AI system 125 may apply the prompt 430 to the machine learned model 410 to produce the annotated text data 450. The AI system 125 provides the annotated text data 450 to the online concierge system 140. Note in other embodiments, the AI system 125 and the machine learned model 410 are part of the online concierge system 140.

The annotated text data 450 includes unstructured textual descriptions of the given item that include the item identifier. In the illustrated example, the annotated text data 450 includes unstructured textual descriptions of the item and each description includes the item identifier, [P123], for the item. In this manner structured data for the item is converted to unstructured data for the item that includes the item identifier. The annotated text data 450 may be used to train (e.g., fine tune) a search and recommendation model (e.g., the search and recommendation model 215).

In some embodiments, the online concierge system 140 may generate annotated text for each item of the online catalog 420. In other embodiments, the online concierge system 140 may, for a subset of items of the online catalog 420, generate a corresponding subset of annotated text data. The online concierge system 140 may then convert the corresponding subset of annotated text data into example shells which can be used for other items of the online catalog 420. In this manner, the machine learned model 410 can be used to generate a relatively small number of annotated text data, which could then be turned into shells and applied to the relatively large number of items of the online catalog 420 to generate corresponding annotated text data for those items.

Figure 5:
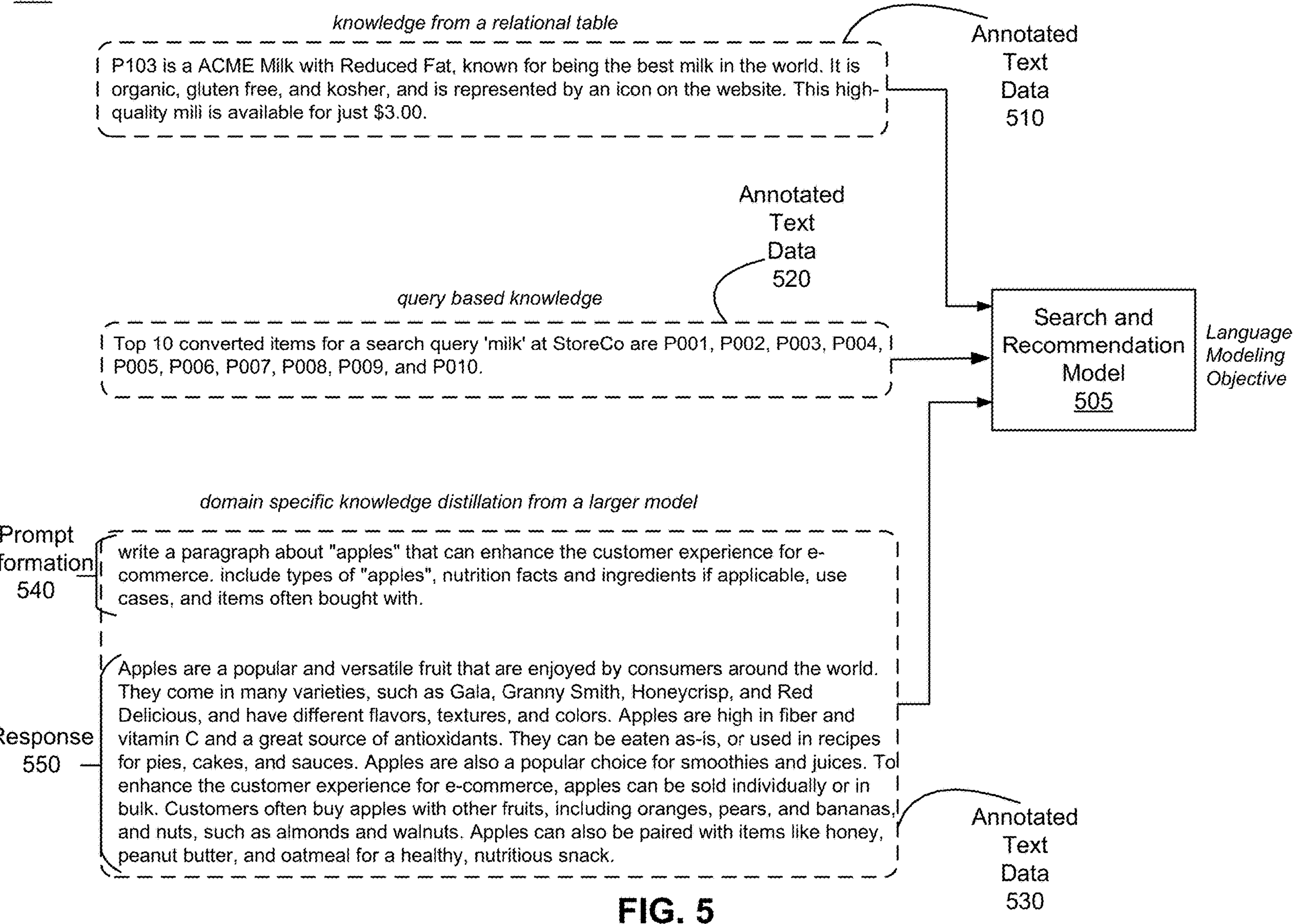
FIG. 5 is an example training of a search and recommendation model, in accordance with some embodiments.

FIG. 5 is an example training 500 of a search and recommendation model 505, in accordance with some embodiments. As illustrated, the search and recommendation model 505 is a pre-trained LLM, and is implemented in accordance with one or more embodiments of the search and recommendation model 215. The search and recommendation model 505 is fine-tuned with annotated text data 510, 520, and 530. The annotated text data 510, 520, 530 may have been generated as described above with regard to, e.g., FIGS. 1-4.

The annotated text data 510 is based on knowledge from a relation table or database, like, e.g., the online catalog of the online concierge system 140. The annotated text data 520 is based on query based knowledge, like, e.g., information derived from the customer data.

Note that while the annotated text data 510 and 520 are derived from structured data used by the online concierge system 140, the annotated text data 530 is not. Instead, the annotated text data 530 is based on domain specific knowledge distillation from a larger model. For example, the annotated text data may include prompt information 540 that was used as part of a prompt to instruct a machine learned model (e.g., the machine learned model of the AI system 125) to generate a response 550 to the prompt information 540. In this manner the annotated text data 530 functions to distill world knowledge from the machine learned model (which likely is a larger model than the search and recommendation model 215) that can then be used to train the search and recommendation model 215. The prompt information 540 and the associated response 550 are selected (e.g., by the machine learning training module 230) to encourage the search and recommendation model 215 to retain world knowledge specific to the e-commerce domain and linguistic syntax and semantics of the language in the machine learned model of the AI system 125. This step may allow the machine learning training module 230 to naturally transfer domain knowledge to the search and recommendation model 215 through an innate ability to learn and memorize. In this manner, during training, the search and recommendation model 215 can learn item identifiers as novel vocabularies while also establishing correlations between these new concepts and the pre-existing world knowledge embedded in the search and recommendation model 215.

Note, fine tuning the search and recommendation model 215 with an LM objective using annotated text data has several advantages. First, the fine tuning can be done without using labeled data. Instead, the labeled data may be first transformed into natural text (i.e., the annotated text data) which is then used to fine tune the search and recommendation model 215. Additionally, the use of LM objectives is highly effective method for transferring knowledge, mirroring the objectives employed in fine tuning a pre-trained LLM.

Figure 6:
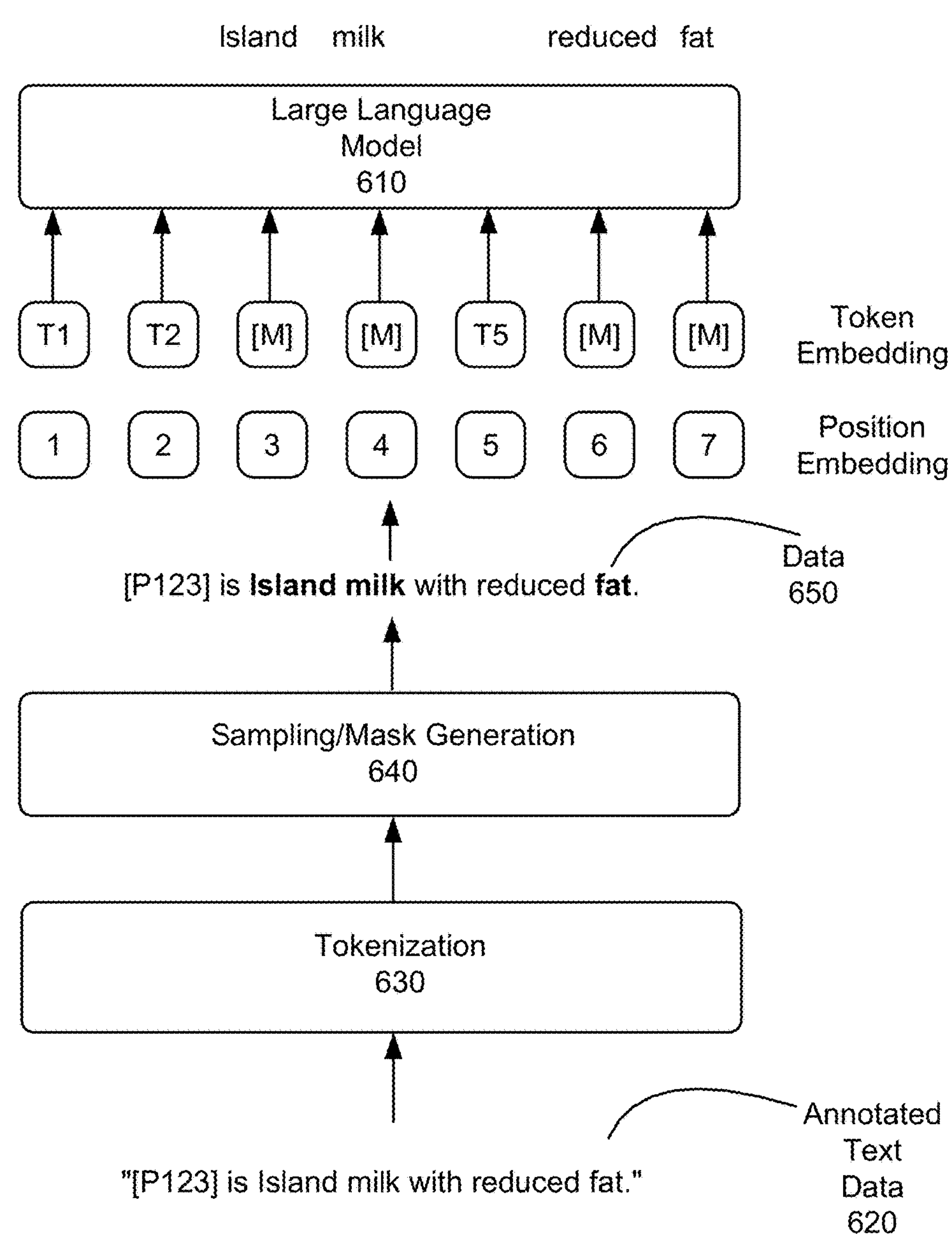
FIG. 6 is an example training of a large language model, in accordance with some embodiments.

FIG. 6 is an example training 600 of a LLM 610, in accordance with some embodiments. As illustrated, the LLM 610 may be implemented in accordance with one or more embodiments of the search and recommendation model 215 or some other LLM used by the online concierge system 140. In one or more embodiments, the LLM 610 is an encoder based masked language modeling architecture.

Annotated text data 620 is tokenized 630. For example, tokenization may use natural language tokens, item identifier tokens, online concierge system domain tokens (e.g., brand names, item names, etc.). The resulting tokenized data is sampled and masked 640 to generate data 650 that has certain tokens that are to be masked. In one or more embodiments, there are seven tokens that each have their own position, and the third, fourth, sixth, and seventh tokens are masked. The LLM 610 is trained to predict the original tokens at those masked positions. The loss may be calculated based on the LLM 610's predictions and the actual target tokens (the original tokens that were masked).

Figure 7A:
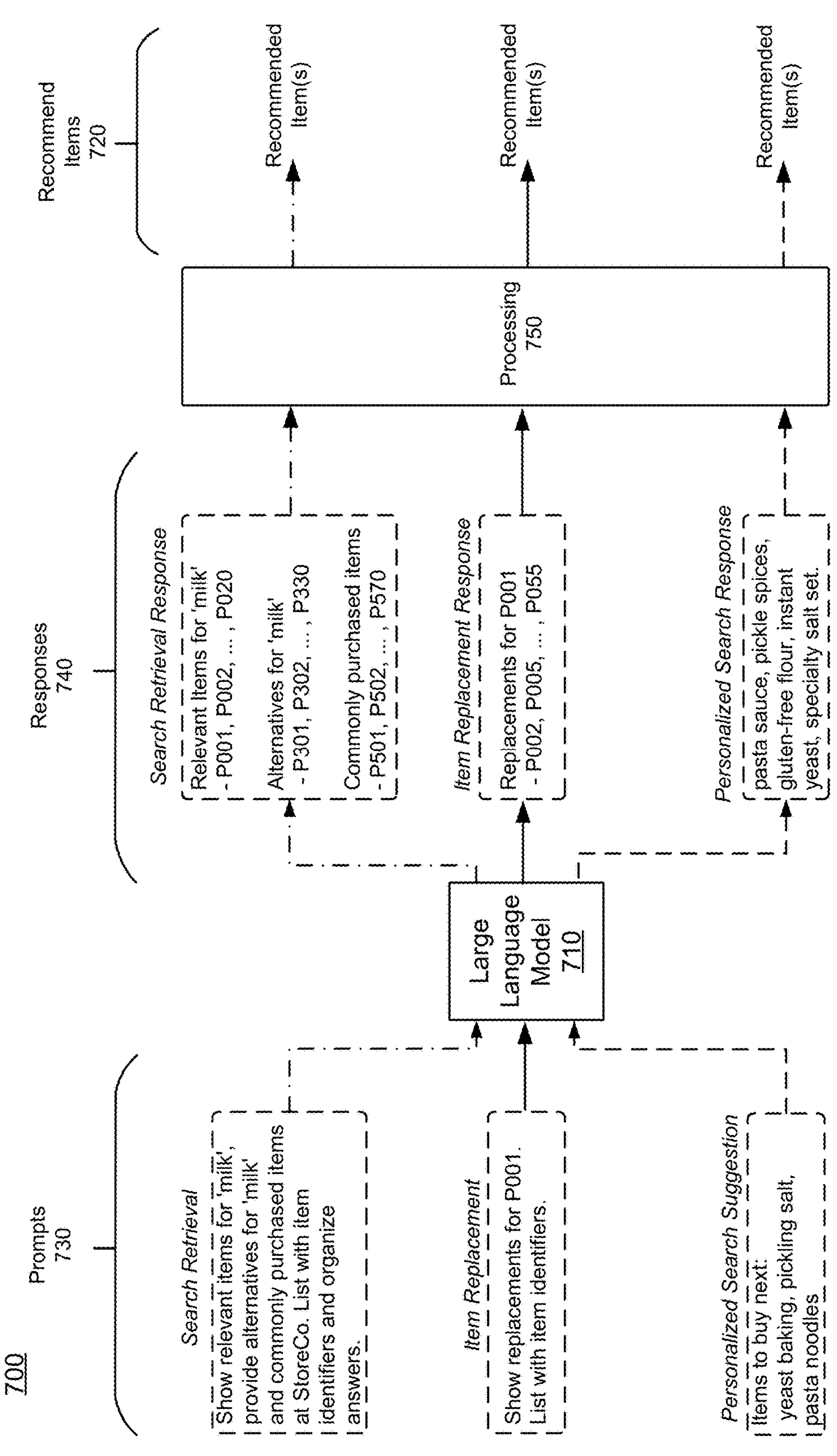
FIG. 7A is an example use of a large language model to generate recommended items, in accordance with some embodiments.

FIG. 7A is an example use 700 of a LLM 710 to generate recommended items 720, in accordance with some embodiments. As illustrated, the search and recommendation model 215 includes the LLM 710. In one or more embodiments, the LLM 710 may be used in a zero-shot configuration.

The online concierge system 140 inputs one or more prompts 730 to the LLM 710. In this example, the prompts 730 include prompts pertaining to different tasks like, e.g., search retrieval, item replacement, and personalized search suggestion. The prompt associated with search retrieval may have been generated responsive to a customer search of "milk" for a Retailer. The prompt associated with item replacement may have been generated responsive to situations where at checkout there is low stock for an item (e.g., P001). The prompt associated with the personalized search suggestion may have been responsive to generating content for the online interface. One or more of the prompts may be provided to the LLM 710.

The LLM 710 generates corresponding responses 740. The generated responses 740 may include, e.g., item predictions. The item predictions may include item identifiers. For example, the search retrieval response and the item replacement response both include item predictions that have item identifiers. The online concierge system 140 processes 750 the responses 740 to generate the recommended items 720. Processing is described above in detail with regard to, e.g., FIGS. 2 and 3. Processing may include, e.g., parse/entity linking (e.g., to retrieve up to date pricing and availability information), scoring responses generated for a particular prompt, ranking responses (e.g., item predictions) generated for a particular prompt, and selecting one or more recommended items from the ranked responses. Parse/entity linking may be used to obtain, e.g., up-to-date pricing information, availability information, etc., by connecting to a current version of the online catalog or some other database that includes the current information. Ranking may be performed using multi-objective ranking.

Figure 7B:
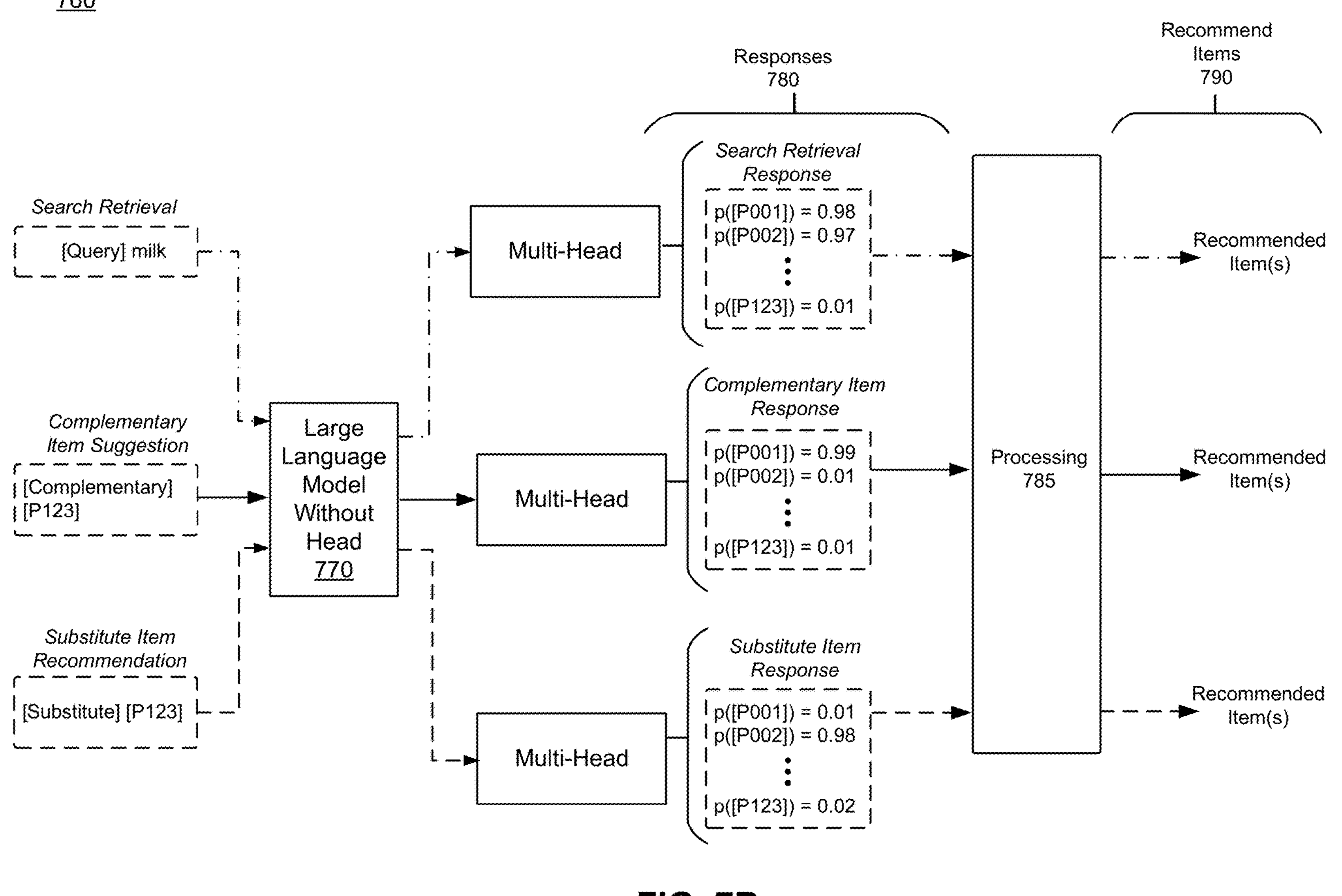
FIG. 7B is an example use of a large language model that does not include a head to generate recommended items, in accordance with some embodiments.

FIG. 7B is an example use 760 of a LLM that does not include a head to generate recommended items 790, in accordance with some embodiments. For conciseness, the LLM without a head may be referred to as a "LLM 770." In one or more embodiments, the search and recommendation model 215 includes LLM 770, which may be implemented as the LLM 710 (e.g., previously trained with the annotated text data) that has been further fine-tuned with supervised tasks and modified. The modifications include removing a last projection layer that was used for token generation in the LLM 710, and adding an aggregation layer (e.g., potentially incorporating pooling methods, to produce refined representations) and a head with an output size that matches the number of classes (products) is added to create a classification model. In one or more embodiments, the model comprises multiple classification models with one shared LLM without its own heads.

In this example, several tasks that can be performed with an encoder based approach. In this example, task identifiers can be used to perform multiple tasks using a single LLM (i.e., the LLM 770). For a search relevance task, a multi-class-multilabel classification task may be used, where # of classes equals # of item identifiers. For a single query, the online concierge system 140 can map multiple relevant item identifiers that can be fed into the LLM 770. A sample training example is shown in the following. A potential training example may be: ""[Query] milk [P001]" ([P001], 0.4), ([P006], 0.3) . . . , ([P234], 0.1)," where [Query] is a task identifier and the information within each set of parenthesis includes an item identifier for an item and an associated score (e.g., relevance score) whether the item is relevant to the query. For a complementary item suggestion task, given an item, the online concierge system 140 predicts multiple complementary items that can go well together. This problem can also be solved as a multiclass-multilabel classification task. A substitute item recommendation task, is similar to the complementary item suggestion task in terms of input and output types but has a different task identifier (i.e., [Substitute] instead of [Complementary]).

Once the LLM 770 is fine-tuned, the inference for an encoder model approach becomes faster compared to a generative language model. The LLM 770 may use a target task identifier with a query (a search term or an item identifier), perform a single inference of the LLM 770, and obtain responses 780. The responses 780 include item predictions for the various tasks, and each of the item predictions include probability scores (i.e., relevance scores) for all item identifiers from the LLM 770. The online concierge system 140 may then process 785 the responses 780 to obtain recommended items 720 for the various tasks. In this embodiments, processing 785 may use, for a given set of item predictions, e.g., top K selection logic (v. parsing and entity linking) and multi-objective ranking to determine recommended items A benefit of using an encoder-based approach is that it has predictable inference time complexity since it can directly produce item identifiers as results using a single inference. Single inference per task is advantageous, leading to lower run-time costs. However, this approach has several drawbacks.

In some embodiments, the online concierge system may utilize both the benefits of generative language model and a classification model. For the most popular tasks, the online concierge system may utilize the encoder model approach for faster inference while quickly prototyping new applications with the generative approach.

Figure 8:
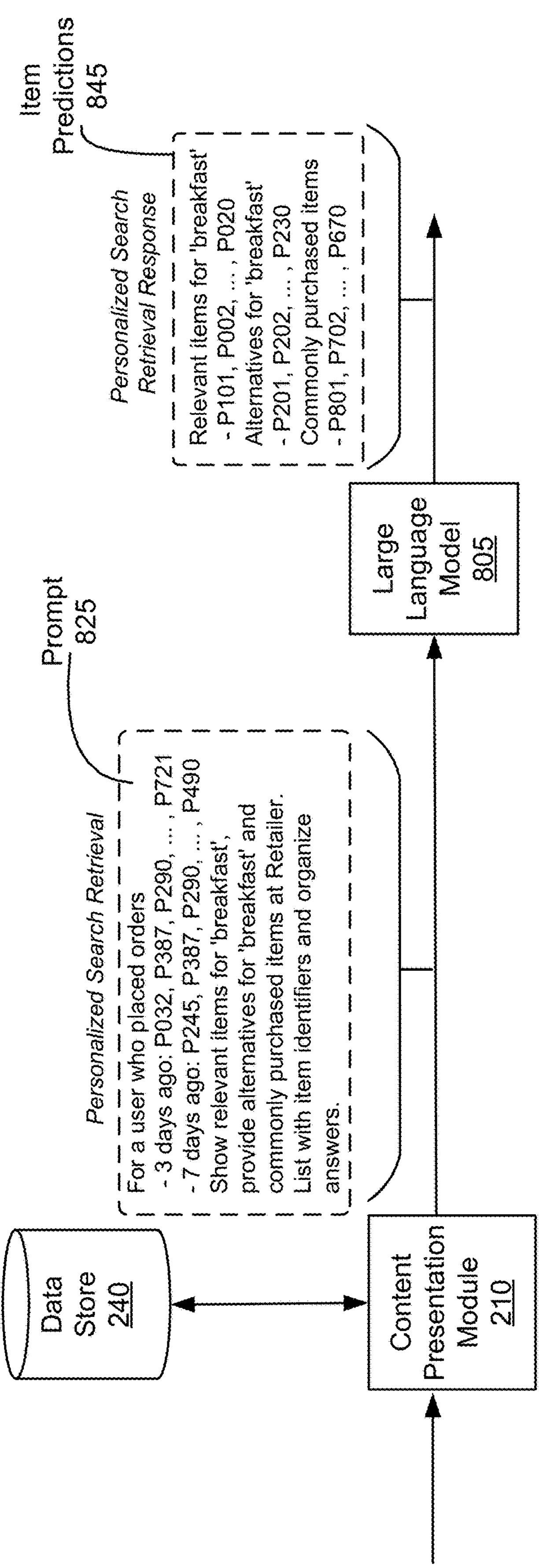
FIG. 8 is an example personalized search that uses a large language model, in accordance with some embodiments.

FIG. 8 is an example personalized search 800 that uses a LLM 805, in accordance with some embodiments. In one or more embodiments, the search and recommendation model 215 includes the LLM 805. The example illustrates a zero-shot configuration, but in other embodiments, few-shot learning and/or fine-tuning approaches may be used.

At 805 the content presentation module 210 receives a search query (e.g., breakfast at a Retailer) from a customer client device associated with a customer. The content presentation module 210 retrieves customer data for the customer from the data store 240. The content presentation module 210 uses the search query and the customer data to generate a prompt 825. The content presentation module 210 provides the prompt 825 to the LLM 805. The LLM 805 outputs item predictions 845. In some embodiments, the item predictions 845 may be processed to select one or more recommended items to provide to the customer client device response to the search query. In other embodiments, the item predictions 845 may undergo one or more additional rounds of personalization before recommended item(s) are selected.

Figure 9:
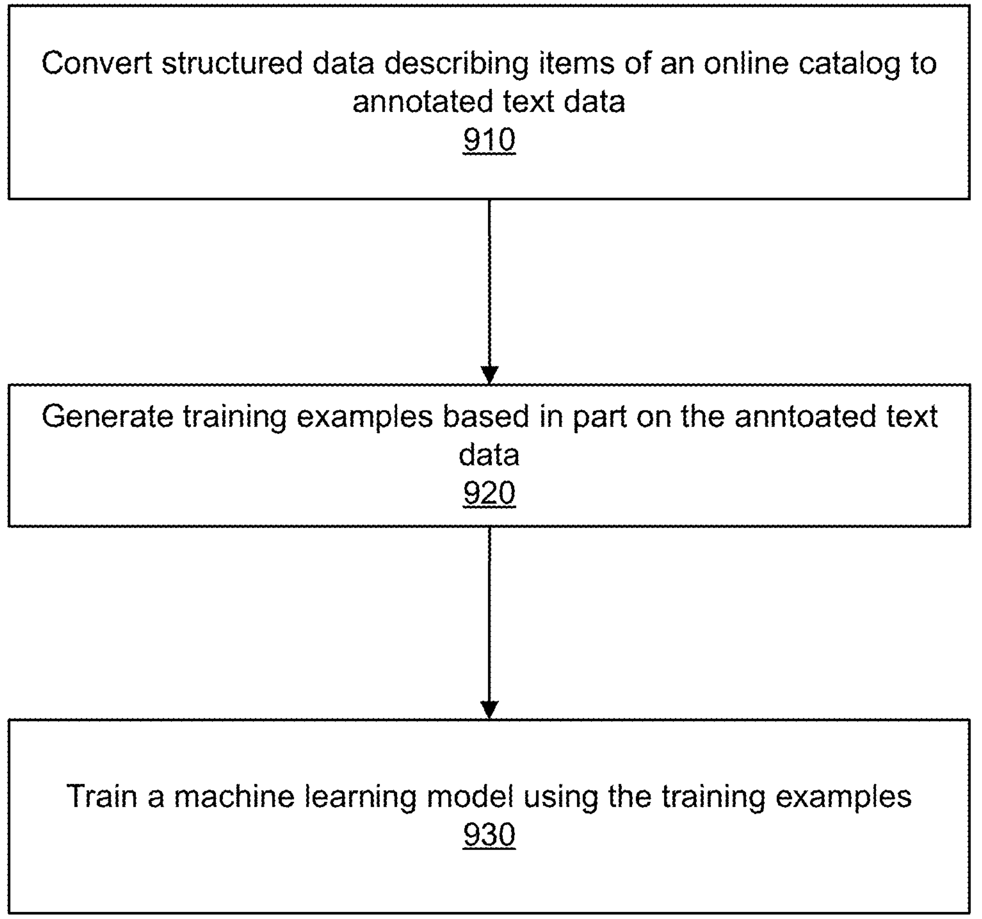
FIG. 9 is a flowchart for a method of training a machine learned model, in accordance with some embodiments.

FIG. 9 is a flowchart for a method of training a machine learned model, in accordance with some embodiments. The machine learned model may be, e.g., the search and recommendation model 215. Alternative embodiments may include more, fewer, or different steps from those illustrated in FIG. 9, and the steps may be performed in a different order from that illustrated in FIG. 9. These steps may be performed by an online concierge system (e.g., online concierge system 140). Additionally, each of these steps may be performed automatically by the online concierge system without human intervention.

The online concierge system converts 910 structured data describing items of an online catalog to annotated text data. The annotated text data is composed of unstructured textual descriptions of the items that include item identifiers for the items. In some embodiments, the online concierge system generates templates based on item data of the online catalog (i.e., an attribute of structured data for an item in the online catalog). The online concierge system may generate multiple templates for a given attribute. In some embodiments, the online concierge system uses an AI system (e.g., the AI system 125) to generate templates. The online concierge system uses the generated templates and the online catalog to generate one or more prompts for the machine learned model of the AI system. The one or more prompts instruct the machine learned model to generate corresponding annotated text data. The online concierge system provides the one or more prompts to the AI system. Responsive to receiving the one or more prompts, the AI system applies the prompts to the machine learned model to generate annotated text data, and provides the generated annotated text data to the online concierge system. In some embodiments, the online concierge system may use the AI system to generate annotated text data for each item of the online catalog. In other embodiments, the online concierge system may, for a subset of items of the online catalog, generate a corresponding subset of annotated text data. The online concierge system may convert the corresponding subset of annotated text data into example shells which can be used for other items of the online catalog.

The online concierge system generates 920 training examples based in part on the annotated text data. The generated training examples include the descriptions of the items. In some embodiments, the generated training examples may use descriptions derived from query based knowledge, knowledge from a relational table, etc. In some embodiments, the online concierge system may also generate training examples that are derived from domain specific knowledge distillation from a larger model.

The online concierge system trains 930 a machine learned model (e.g., the search and recommendation model 215) using the training examples. The training is to predict one or more items of the online catalog that are related to the descriptions such that for a given prompt (that is based in part on a search query) the machine learned model outputs item predictions related to the query that include item identifiers.

Figure 10:
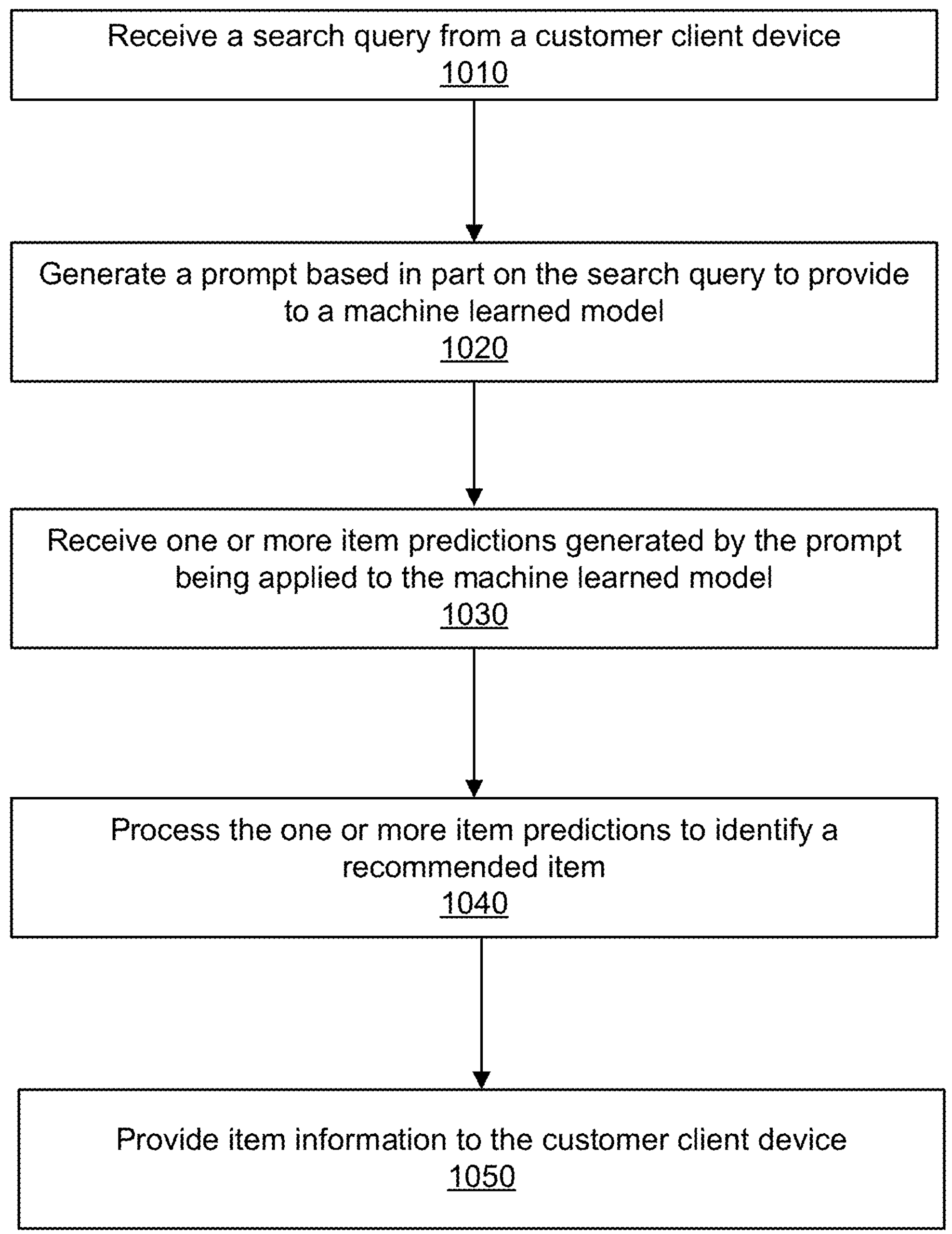
FIG. 10 is a flowchart for a method of using a machine learned model for search and recommendation, in accordance with some embodiments.

FIG. 10 is a flowchart for a method of using a machine learned model for search and recommendation, in accordance with some embodiments. Alternative embodiments may include more, fewer, or different steps from those illustrated in FIG. 10, and the steps may be performed in a different order from that illustrated in FIG. 10. These steps may be performed by an online concierge system (e.g., online concierge system 140). Additionally, each of these steps may be performed automatically by the online concierge system without human intervention.

The online concierge system receives 1010 a search query from a customer client device (e.g., the customer client device 100). For example, a customer may use an ordering interface of the customer client device to enter the search query.

The online concierge system generates 1020 a prompt based in part on the search query to provide to a machine learned model. The machine learned model may be a search and recommendation model (e.g., the search and recommendation model 215). The machine learned model may be part of, e.g., an AI system (e.g., the AI system 125). In other embodiments, the machine learned model may be part of the online concierge system. The prompt instructs the machine learned model to provide one or more item predictions.

The online concierge system receives 1030 one or more item predictions generated by the prompt being applied to the machine learned model. The received one or more item predictions have corresponding item identifiers that can be used to specifically identify corresponding items in, e.g., an online catalog (and/or some other structured data and/or semi-structured data) of the online concierge system.

The online concierge system processes 1040 the one or more item predictions to identify one or more recommended items from the one or more item predictions. For example, the online concierge system may score the one or more item predictions (e.g., using relevance scores), rank (e.g., multi-objective ranking), the scored one or more item predictions, and select the one or more recommended items based in part on the ranking. The processing may include determining item information (e.g., via parsing/entity linking) for the one or more recommended items using item identifiers associated with the one or more recommended items. For example, the online concierge system may use the item identifier and pricing information for the recommended item in the online catalog and/or some other structured or semi-structured data that includes pricing information for items of the online catalog. The online concierge system may update item information for the one or more recommended items with the current prices.

The online concierge system 140 provides 1050 to the customer client device item information describing the one or more recommended items. The item information may include, e.g., current prices, name, band, availability, icon, etc. The customer client device may present the item information to the customer via, e.g., the ordering interface.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer readable medium, comprising:

accessing structured data describing items of an online catalog;

converting the structured data describing the items of the online catalog to annotated text data, wherein annotated text data is unstructured textual descriptions of the items that include item identifiers;

generating training examples based on the annotated text data and the structured data, wherein the training examples include the unstructured textual descriptions of the items; and training a classification machine-learning model using the training examples to predict one or more items of the online catalog that are related to the descriptions, such that, for a given prompt that is based in part on a query, the classification machine-learning model outputs item predictions related to the query that include item identifiers.

2. The method of claim 1, wherein converting the structured data describing the items of the online catalog to the annotated text data, further comprises:

generating a first prompt to provide to a generative machine-learning model, the first prompt instructing the generative machine-learning model to generate templates for a set of items in the online catalog;

providing the first prompt for execution on the generative machine-learning model to generate templates for the set of items in the online catalog; and generating the annotated text data for the set of items in the online catalog using the generated templates.

3. The method of claim 2, wherein generating the annotated text data for the set of items in the online catalog using the generated templates, further comprises:

generating a second prompt based in part on the templates, the second prompt instructing the generative machine-learning model to convert the structured data describing the set of items of the online catalog to the annotated text data; and providing the second prompt for execution on the generative machine-learning model to generate the annotated text data.

4. The method of claim 2, wherein the generative machine-learning model is a large language model trained on a corpus of training data to generate outputs for natural language processing tasks.

5. The method of claim 2, wherein converting the structured data describing the items of the online catalog to the annotated text data, further comprises:

removing item data from the annotated text data of one or more items in the set of items to generate one or more shells; and populating the one or more shells with item data from another item to generate an annotated text datum.

6. The method of claim 1, wherein converting the structured data describing the items comprises converting item data in the online catalog, and wherein generating the training example comprises generating the training example using information determined from the item data.

7. The method of claim 1, further comprising:

converting semi-structured data describing one or more items of the online catalog to additional annotated text data, wherein the additional annotated text data includes unstructured textual description of the one or more items that includes an item identifier; and generating additional training examples based on the semi-structured data and the additional annotated text data, wherein training the classification machine-learning model further comprises training with the additional training examples.

8. The method of claim 1, wherein training the classification machine-learning model comprises:

training the classification machine-learning model to output a relevance score indicating relevance of each item prediction to the given prompt.

9. The method of claim 1, wherein training the classification machine-learning model comprises:

accessing a pre-trained large language model trained on a corpus of training data to generate outputs for natural language processing tasks; and fine tuning the pre-trained large language model with the training examples.

10. The method of claim 1, wherein training the classification machine-learning model comprises:

tokenizing the annotated text data;

masking one or more tokens in the annotated text data;

applying the classification machine-learning model to predict tokens corresponding to the masked tokens;

scoring the predicted tokens by identifying a loss between the predicted tokens and original tokens in the annotated text data; and training the classification machine-learning model to minimize the loss.

11. A method, performed at a computer system comprising a processor and a non-transitory computer readable medium, comprising:

accessing structured data describing items of an online catalog;

for each item in the online catalog:

generating a prompt including description identifying the item based on the structured data, wherein the prompt includes a request to generate additional contextual information related to the item, providing the prompt for execution on a generative machine-learning model to output annotated text data including additional contextual description related to the item, wherein the generative machine-learning model is a large language model trained on a corpus of training data to generate outputs for natural language processing tasks, and generating a training example based on the additional contextual description identifying the item and the annotated text data, distilling domain-specific knowledge from the generative machine-learning model; and training a classification machine-learning model using the training examples to predict one or more items of the online catalog that are related to the additional contextual descriptions, such that, for a given prompt that is based in part on a query, the classification machine-learning model outputs item predictions related to the query that include item identifiers.

12. The method of claim 11, wherein generating the prompt, for each item in the online catalog, further comprises:

generating the prompt to include a request to identify attributes describing the item.

13. The method of claim 11, further comprising:

accessing query data indicating one or more item identifiers corresponding to items engaged with in response to each query of a plurality of queries;

generating an additional training example for each query indicating the one or more item identifiers engaged with in response to the query; and training the classification machine-learning model with the additional training examples.

14. The method of claim 11, further comprising:

accessing relational data indicating one or more item attributes for each item of the online catalog;

generating an additional training example for each item indicating the one or more item attributes from the relational data; and training the classification machine-learning model with the additional training examples.

15. The method of claim 11, wherein the generative machine-learning model is a large language model trained on generic data.

16. The method of claim 11, wherein training the classification machine-learning model comprises:

training the classification machine-learning model to output a relevance score indicating relevance of each item prediction to the given prompt.

17. The method of claim 11, wherein training the classification machine-learning model comprises:

accessing a pre-trained large language model trained on a corpus of training data to generate outputs for natural language processing tasks; and fine tuning the pre-trained large language model with the training examples.

18. The method of claim 11, wherein training the classification machine-learning model comprises:

tokenizing the annotated text data of the training example;

masking one or more tokens in the annotated text data;

applying the classification machine-learning model to predict tokens corresponding to the masked tokens;

scoring the predicted tokens by identifying a loss between the predicted tokens and original tokens in the annotated text data; and training the classification machine-learning model to minimize the loss.

19. The method of claim 11, further comprising:

accessing user data related to a first user of an online system, the user data describing one or more queries provided by the first user for execution by the classification machine-learning model and one or more item identifiers engaged with following execution of each query by the classification machine-learning model;

generating user-specific training examples based on the one or more queries and the one or more item identifiers; and tuning the classification machine-learning model with the user-specific training examples.

20. The method of claim 11, wherein the generative machine-learning model is larger in size than the classification machine-learning model.

* * * * *